(12) United States Patent
Schmalfuss

(10) Patent No.: US 7,295,299 B2
(45) Date of Patent: Nov. 13, 2007

(54) DEVICE FOR OPTICALLY MEASURING SURFACE PROPERTIES

(75) Inventor: Harold Schmalfuss, Geretsried (DE)

(73) Assignee: Jenoptik Surface Inspection GmbH, Munich (DE)

( * ) Notice: Subject to any disclaimer, the term of this patent is extended or adjusted under 35 U.S.C. 154(b) by 435 days.

(21) Appl. No.: 10/492,564

(22) PCT Filed: Oct. 22, 2002

(86) PCT No.: PCT/EP02/11802

§ 371 (c)(1),
(2), (4) Date: Apr. 14, 2004

(87) PCT Pub. No.: WO03/036231

PCT Pub. Date: May 1, 2003

(65) Prior Publication Data

US 2004/0233454 A1    Nov. 25, 2004

(30) Foreign Application Priority Data

Oct. 22, 2001    (DE) ................................ 101 51 332

(51) Int. Cl.
*G01N 21/00* (2006.01)
(52) U.S. Cl. .................................................. 356/237.2
(58) Field of Classification Search ................ None
See application file for complete search history.

(56) References Cited

U.S. PATENT DOCUMENTS

| | | | |
|---|---|---|---|
| 4,218,144 A | | 8/1980 | Whitehouse et al. |
| 4,583,861 A | * | 4/1986 | Yamaji et al. ............... 356/446 |
| 4,973,164 A | | 11/1990 | Weber et al. |
| 5,243,406 A | | 9/1993 | Ando et al. |
| 5,608,527 A | * | 3/1997 | Valliant et al. .............. 356/600 |
| 5,712,701 A | * | 1/1998 | Clementi et al. ......... 356/237.2 |
| 7,106,432 B1 | * | 9/2006 | Mapoles et al. .......... 356/237.2 |

FOREIGN PATENT DOCUMENTS

| | | |
|---|---|---|
| DE | 30 37 622 C2 | 2/1987 |
| DE | 251 611 A1 | 11/1987 |
| DE | 38 05 785 A1 | 9/1989 |
| DE | 43 24 800 A1 | 2/1995 |
| JP | 61029744 A | 2/1986 |

* cited by examiner

*Primary Examiner*—Gregory J. Toatley, Jr.
*Assistant Examiner*—Juan D Valentin II
(74) *Attorney, Agent, or Firm*—Wood, Phillips, Katz, Clark & Mortimer

(57) ABSTRACT

An apparatus for optical measurement of surface properties wherein a light spot is produced by an illumination device and reflected light is measured by a multiplicity of optical sensors. In the evaluation, the individual signals of sensors, at least a multiplicity of signals of comparatively small groups of sensors is taken into account. Thus, an extrapolation of the detection angle region is possible.

20 Claims, 2 Drawing Sheets

DEVICE FOR OPTICALLY MEASURING SURFACE PROPERTIES

Figure 1:
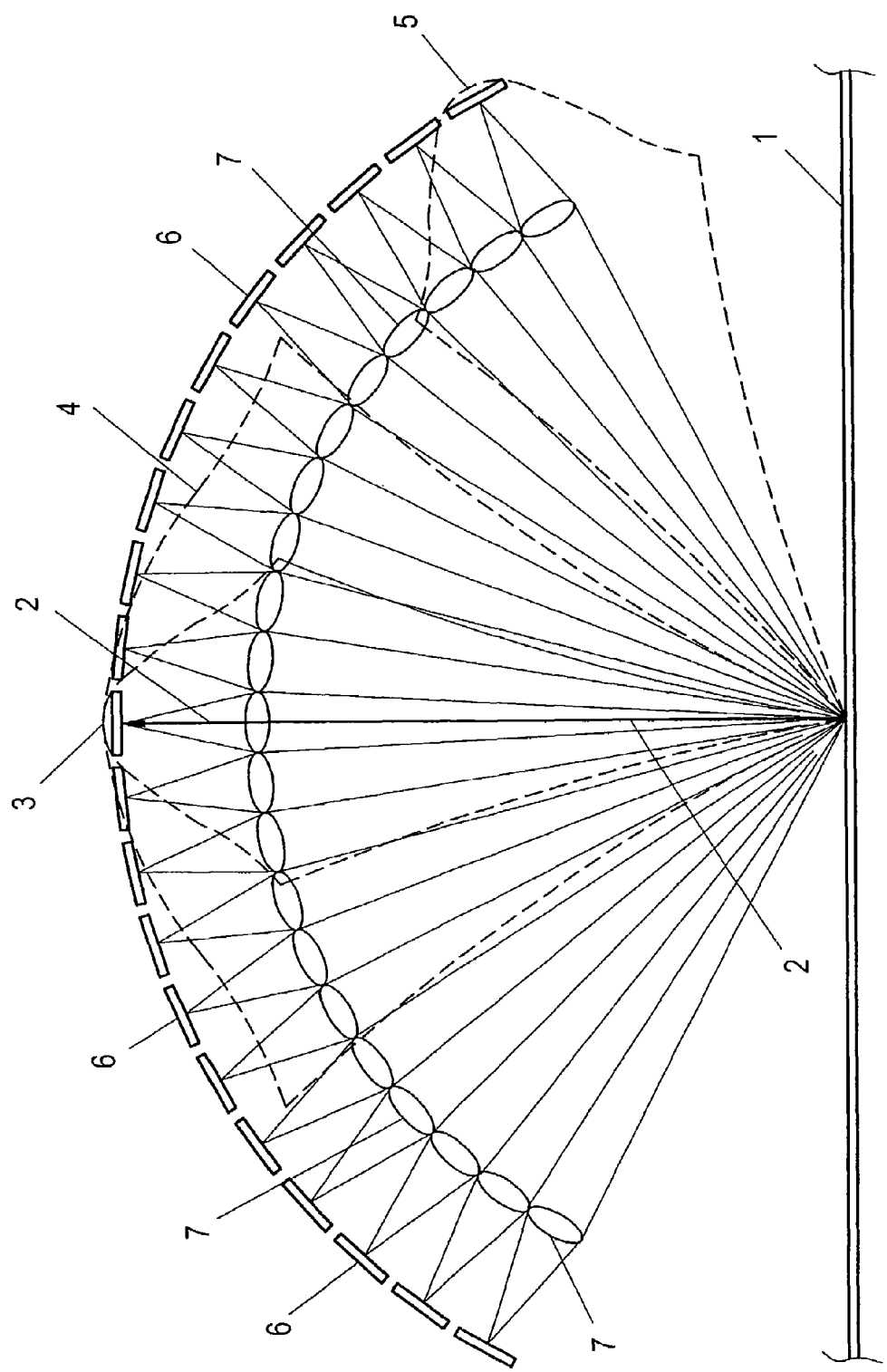

The present invention relates to an apparatus for optical measurements of surface properties.

This is to be understood as an apparatus comprising an illumination device to produce a light spot on the surface of a measurement object. Light reflected by the surface is detected and evaluated. Hereto, a large number of optical sensors is provided which are arranged in an adequate manner. They should cover a certain and not too small area of reflection angles, i. e. should be adapted to detect light reflected under these reflection angles. Further, an evaluation device is provided to evaluate the signals produced by the sensors in order to determine the required surface properties of the measurement object.

A known apparatus of this kind is described in DE 38 05 785 A1. This document proposes, in order to determine surface profiles of material surfaces, to evaluate reflection angles of the reflection of laser light on a surface by means of an angular arrangement of light sensors centred on the surface and irradiation of a light spot on the angular centre on the surface by a laser. The surface profiles shall be determined from the reflection angles by integration. Therein, the reflection angles are determined by a series connection of the sensors and an evaluation of signals derived from the ends of this series connection, whereby a centre of mass is produced in the reflection angle determination.

The present invention has the technical object to provide an apparatus of the above described type that is improved compared to the cited prior art.

According to the invention, an apparatus is provided in which the signals of a multiplicity of groups of sensors being respectively adjacent to each other are supplied to the evaluation device in a group-wise and separated manner.

Preferred embodiments are defined in the dependent claims.

The basic idea of the invention is that in the series connection of sensors proposed in the cited prior art a disadvantageously low flexibility in the evaluation of the signals is produced. Although the solution proposed in the prior art has the large advantage that only the two signals produced at the ends of the series connection must be considered, from which, further a single signal representing the required centre of mass can be derived in a very simple manner, by dividing the difference and sum. However, this solution is limited to a linear centre of mass production. Namely, the coupling between the sensor can not be chosen freely so that the conventional apparatus can not be used for different advantageous applications.

In contrast thereto, according to the invention, a multiplicity of signals from the sensor arrangement is used wherein those sensors that are respectively combined to a common signal are named "a group" in this description. Preferably, in this invention each group consists of exactly one sensor so that each single sensor signal is taken into account. The invention can, however, also be used by producing a common signal from a not too large group of adjacent sensors so that finally a multiplicity of sensor signals is provided that still represents the spatial resolution of the complete arrangement.

This provides for a substantially increased flexibility because the coupling between the sensors or between the groups can be freely chosen. Possible applications are widespread wherein the invention is not limited to special ones of these advantageous applications. E. g. signals from the respective sensors or groups can be logarithmized for a further processing whereby a substantially increased dynamic range is provided. Further, contributions of different sensors can be weighted differently and geometrical properties of the arrangement or sensitivity differences and comparable circumstances can be compensated thereby. Further, a background correction is feasible in measuring the signals of the groups without operating the illumination device and defining them as a background pattern. During the proper measurement, this signal pattern can be subtracted from the actual signals. Finally, the centre of mass determination can be conducted also in a non-linear manner, e. g. by square weighting. These and other possibilities to be described hereunder need not be applicable simultaneously in order to use the invention. Instead, the advantage of the invention is the fundamental flexibility of the group-wise signal evaluation.

Especially, the surface properties to be measured can be a surface profile (or contour) or characteristic data for a surface roughness. The measurement object is preferably, but not necessarily, a planar material run. The illumination device my comprise practically, but not necessarily, a semiconductor laser diode. The sensors are preferably arranged in a plane intersecting the surface to be measured in the region of the light spot. Also further sensors can be provided in possible further planes. Within the plane, the sensors should be arranged relatively dense in order to provide a substantially gap-free detection of the reflected light along the required detection angle range. Therein, the resolution and density of the arrangement can be adapted to the scattering angle width to be expected of the reflected light.

In total, preferably at least 21 sensors should be provided that are divided into at least 7 groups.

The illumination device, e. g. the laser diode, can be directed in such a manner that the surface of the measurement object is illuminated obliquely. Thereby, the reflected light in case of a mirror reflection on a planar surface is also inclined against the surface normal and also against the illumination direction. The arrangement of the sensors, which are usually arranged around the direction of such a mirror reflex, interferes less with the illumination device, i. e. need not to be interrupted thereby.

Between the sensors and the surface to be measured, lens systems can be provided in order to converge the reflected light on the sensors or to decrease its divergence. Therein, both large single lenses and arrangements of a multiplicity of lenses are possible. Single lenses can be torical and can be curved concavely over the surface with respect to the surface.

A measurement of the surface according to the invention can be conducted locally, e. g. with one or a certain number of stationary single measurements per measurement object. Therein, the light spot can be that large that the required surface properties are detected over a sufficiently large surface area. It is, however, preferred that a relative movement is produced between the light spot and the surface during the measurement, i. e. the properties of the surface are measured along a track or a material run. Especially, it can be concluded from the reflection angles along the track or run on the profile progression of the surface along the track or run by means of integration or addition, what has already been described in the cited prior art. Beside the possibility already described in the prior art, to move the measurement object during the measurement and to hold the device stationary, also the device can be moved. It is, however, preferred to measure with a stationary device on a moving measurement object. The invention especially relates to a production monitoring in production trains and production lines in which the measurement object, usually substantially a plane material run, is transported anyway. This movement can then be used for a measurement of the profile progression. Therein, the term "production" includes working steps. A mill train or a coating train thus is also a production line.

Alternatively or additionally, there is the possibility to adapt the illumination device in order to be able to move the light spot by the illumination device along the surface. E. g. a polygon mirror scanner can be used hereto. This light spot movement can be used instead of a movement of the device or the measurement object surface or superposed thereon. Especially, quasi two-dimensional surface regions can be scanned thereby in a line by line manner.

A special advantage of the invention is that a determination of the scattering angle width of the reflected light is now possible. E. g. it can be concluded from this scattering angle width to a micro roughness that can not be detected by the above mentioned profile determination. Therein, the scattering angle width of the reflected light can be used in dependency on the locality or in terms of a local averaging.

An averaging of the scattering angle width values of the reflected light can also be used in order to extrapolate at the border of the detection angle region defined by the arrangement of sensors. Namely, if a part of a somewhat broadened "reflection light lobe" (or cone) extends over the border of the detection angle region defined by the sensors, the centre of mass determination according to the prior art would lead to wrong statements with regard to the centre of mass of this reflection light lobe. This is because a part of the reflection light lobe is not taken into account in the determination. If, however, a determination of the broadening of this reflection light lobe in a temporal average is given according to the invention, the centre of mass (or an otherwise defined centre) can still be concluded from the reflection light lobe in such cases. Under certain circumstances this can be extended such that even a centre of mass outside of the detection angle region can be calculated by extrapolation as long as a part of the reflection light lobe is still detected. The proposed temporal averaging can be conducted in different ways. E.g., in the simplest case it can be conducted independent from the reflection angles, assuming that the underlying material properties do not correlate with the reflection angles. However, also an averaging over the appearing width in the vicinity of the borders of the detection angle range can be conducted in order to better adapt this averaging to the conditions of the extrapolation.

A further possibility provided by the invention is a maximum determination instead of a centre of mass determination. This is not possible with the conventional apparatus, either, as mentioned above. It can deliver more realistic information than a centre of mass determination especially in case of asymmetric reflection light lobes, on the one hand. On the other hand, it can help to increase the effective detection angle region because the detection of the maximum is still possible when a part of the reflection light lobe is outside of the detectable angle region.

In the following, a preferred embodiment of the invention will be explained in detail, wherein the individual features comprised can also be relevant for the invention in other combinations. Further, it is to be clarified that the invention also has the character of a method so that the preceding and the following description are to be understood both in view of the disclosure of apparatus features as well as of method features.

Figure 2:
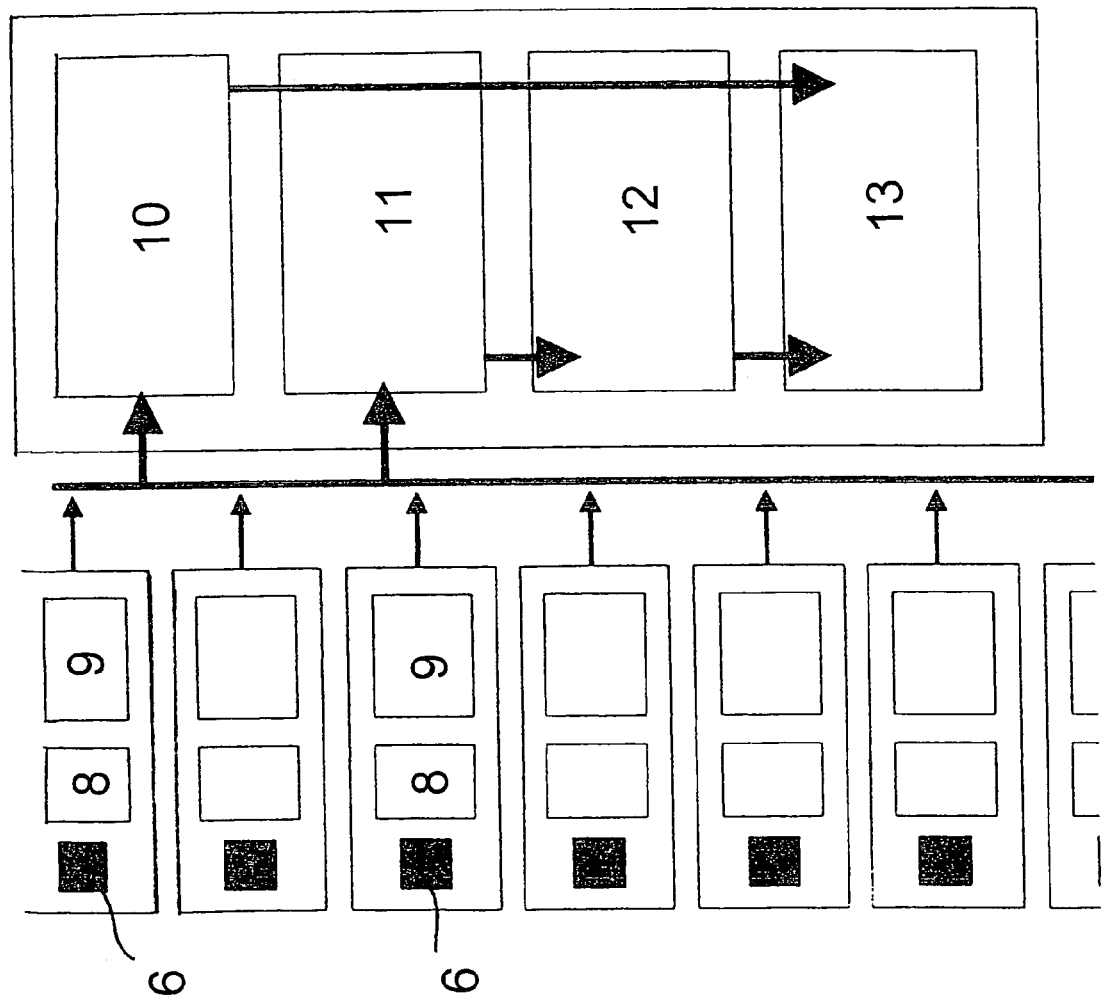

Namely:

FIG. 1 shows a schematic diagram of the optical arrangement of a measuring apparatus according to the invention and FIG. 2 shows a schematic diagram of the arrangement of an evaluation device in this measuring apparatus.

In FIG. 1, 1 designates a sheet metal run as a measuring object. Sheet metal run 1 is shown in cross section, wherein the longitudinal direction is perpendicular to the plane of the drawing. Sheet metal run 1 is material conveyed in a mill train which has been treated with skin path rolls in a preceding working step not shown. Skin path rolls are used for the last procedure during sheet metal production and produce a necessary roughness on the sheet metal surface for later deep-drawing steps or lacquer processes. Therein, the skin path roll may have been treated by shot blast (metal ball bombardment) or electrical discharge machining roughening (EBT, EDT) or by a laser roughening process (Laser Tex) and transfers its surface properties on sheet metal 1. Depending from the surface of sheet metal 1 as such (cold rolled, Zn plated . . . ) the reflection and scattering properties of the surface change by the treatment with the skin path roll. The broadening angle and the angle distribution of light intensity are interesting parameters for a quality check.

The surface of sheet metal 1 is illuminated with focus light 2 of a laser diode not shown, wherein the average irradiation direction of laser light 2 is perpendicular on sheet metal 1 in the sectional diagram of FIG. 1 and is drawn as being representative for the focussed light bundle of the laser and numerated with 2. Reference numerals 3, 4 and 5 show different variations of a reflection light lobe. 3 is a somewhat broadened mirror reflex, 4 is a strongly broadened mirror reflex and 5 is a strongly inclined reflex, the broadening of which corresponds substantially to that of mirror reflex 3. These examples shall illustrate that the reflected light can change in view of the reflection angle (compare the difference between 3 and 5) and the broadening (compare the difference between 3 and 4). The reflection angle represents an inclination of the reflecting surface portion of sheet metal 1, namely in the region of the light spot produced by laser light 2. The broadening represents a micro roughness that can only be characterized by the width of the reflection lobe in a summary manner.

Reflection lobes 3, 4 and 5 as shown are drawn in their outer parts such that their outer shape symbolizes a typical intensity distribution of the reflected light within the respective lobe. The form of lobes 3, 4 and 5 emanating from the illuminated spot on sheet metal 1 shall only symbolize the different sizes of the scattering angle width. The form of the sidelines is to no importance (and only somewhat concave for reasons of the drawing).

The reflected light is measured by an arrangement of a multiplicity of sensors 6 that is a circular arc around the light spot of laser light 2 on sheet metal 1, wherein practically sensors 6 could be provided in a much larger number. For cost reasons only 21 sensors 6 are provided here. Of course, also other numbers are realizable.

FIG. 1 does not show that laser light 2 irradiated by the illumination device is inclined with its optical axis against a surface normal on sheet metal 1, namely in a plane perpendicular to the plane of the drawing and containing both the surface normal and the irradiation direction of laser light 2. The circular arc arrangement of sensors 6 defines a plane further comprising the light spot on sheet metal 1 which also is inclined against the surface normal, namely by the same amount in the opposite direction. One could thus imagine that laser light 2 produces the light spot in the plane of the drawing on sheet metal 1 from obliquely backwards in the perspective of FIG. 1, wherein the reflected light (reflection lobe 3) is reflected obliquely forward and impinges on the angular arrangement of sensors 2. Compare FIGS. 3 and 5 of the cited prior art DE 38 05 785 A1.

A lens array of single lens 7 is arranged stream upward to the circular arc arrangement of sensors 6 and corresponds to the sensors in a one-to-one relation, wherein the reflected light 3, 4 and 5 is focussed with the lens array on sensor 6. Lines show a lobe width respectively corresponding roughly to the width of a single lens 7 leading to a spot focussing on a sensor. This lobe width corresponds to an ideal mirror reflex on sheet metal 1. As soon as a broadening appears in the reflection, a light detection in at least two sensors is produced, independent from the reflection angle.

FIG. 2 shows schematically the arrangement of an evaluation device of the apparatus described so far. On the left side, dark squares 6 symbolize sensors 6 already shown in FIG. 1, only a part of which is shown. Each single sensor 6 is allocated to an AD converter 6 converting the originally analogue output signals of the sensors into digital signals. The digital signals from AD converters 8 are memorized into a fast intermediate memory 9 (FiFo, first in, first out), namely for each sensor individually, from which they can be read out in the memorized order as shown by the arrows.

A center of mass can be determined from the digitalized and intermediately memorized single signals in a portion 10 of the evaluation device. Therein both a linear center of mass determination and a weightened center of mass evaluation or a square center of mass evaluation are feasible.

Further, the individual signals are processed in a portion 11 of the evaluation device such that a typical value for the width of the different reflection lobes 3, 4 and 5 shown in FIG. 1 is produced. This reflection lobe width is averaged in a temporal sense in a portion 12.

By means of this temporal average from portion 12, a further portion 13 of the evaluation device can correct, taking into account the reflection lobe width, the center of mass determined in portion 10 if it is too close to the borders of the angle region detected by the arrangement of sensors 6, shown in FIG. 1 at the left and right outer sides,. E.g. reflection light lobe 5 is so far outward that a substantial part of the reflected light is no longer detected by sensors 6. The center of mass determination in portion 10 is thus erroneous. This can be corrected in portion 13.

As long as the underlying assumption applies that the reflection widths do not correlate too strongly with the reflection angles, i.e. the micro roughness does not correlate with the profile progression on the surface, the detection angle region of the arrangement of sensors 6 can be extended substantially. Namely, while with the above-discussed conventional arrangement of the cited prior art, a precise detection is only possible as long as the complete reflection light lobe is within the detection angle region, the apparatus according to the invention can provide an at least approximated calculation, even if only a part of the reflection light lobe, possibly not even the center of mass itself, is still within the detection angle range.

Finally, also with this apparatus as in the cited prior art, it is calculated from the reflection angles (namely here according to the corrected centers of mass) in an integrating manner backwards to a profile progression of the surface of sheet metal 1. This is not shown in detail in the drawing but thoroughly explained in the cited prior art, the technical disclosure of which is explicitly incorporated here in this respect and in respect of all further technical overlaps. The profile progression results from a movement of sheet metal 1 in the longitudinal direction perpendicularly to the plane of drawing of FIG. 1 so that the light spot moves along the surface relatively to sheet metal 1. Further, the apparatus sketched in FIG. 1 can be extended such that the light spot is moved on the surface of the sheet metal 1 in the horizontal direction of FIG. 1 line by line, for which e.g. a polygon mirror scanner can be used as also shown in the cited prior art in FIG. 4 and the corresponding description. These are variations which are obvious to the expert in view of the prior art so that a detailed description is not necessary.

The embodiment could additionally be improved in that the individual signals of light sensors 6 are corrected after the intermediate memorizing in fast memory 9 and before the already explained processing in portions 10 and 11 in view of an interference light background not correlated to the substantial measurement. Here too, prior to the measurement a typical, possibly temporarily averaged signal pattern can be taken from sensors 6, the laser diode being out of operation. This signal pattern can simply be subtracted from the signal patterns with operating laser diode in a correcting manner so that the complete apparatus can be used without special darkening or blacking out and with substantially unchanged interference light conditions.

The invention claimed is:

1. An apparatus for optical measurement of surface properties of a measuring object comprising
   an illumination device for illuminating said measuring object with a light spot,
   a multiplicity of at least three optical sensors arranged such that they can detect light irradiated by said illumination device and reflected by said surface of said measuring object, and
   an evaluation device for evaluating signals of said sensors for determining said surface properties of said measuring object,
   wherein said evaluation device is programmed to be supplied with and to digitize signals from a multiplicity of at least three groups of respectively adjacent sensors in a groupwise and separated manner, and
   wherein a relative movement can be produced between said light spot produced by said illumination device on said surface of said measuring object and said surface so that said light spot is moved on said surface along a track and said evaluation device is programmed to calculate a profile progression of said surface along said track from reflection angles appearing along said track, and
   wherein said evaluation device is programmed to calculate a center of mass of said reflection angles when at least two sensors detect light due to a broadening of said reflection.

2. An apparatus according to claim 1, in which exactly one sensor is provided for each group.

3. An apparatus according to claim 1, wherein said sensors are arranged substantially along a circular arc having a center on said surface of said measuring object.

4. An apparatus according to claim 1, in which said illumination device is adapted to illuminate said surface of said measuring object in a manner inclined against a normal on said surface.

5. An apparatus according to claim 1, having at least one lens for bundling the light reflected by the surface of said measuring object onto said sensors.

6. An apparatus according to claim 1, in which said sensors are stationary, said measuring object is a material run to be conveyed along a production line, and said relative movement follows from said conveying of said material run.

7. An apparatus according to claim 1, in which said light spot produced by said illumination device can be moved relatively to said surface of said measuring object by said illumination device.

8. An apparatus according to claim 1, in which said evaluation device is adapted for an extrapolation at borders of a detection angle range of said detection device.

9. An apparatus according to claim 8, in which said evaluation device is adapted to determine a temporary average of the scattering angle width of the light reflected by said surface of said measuring object, in order to extrapolate at a border of said detection angle range of said detection device if only a part of the light of said scattering angle width can be detected.

10. An apparatus according to claim 8, in which said evaluation device is adapted to determine a maximum intensity within said scattering angle width of the light reflected by said surface of said measuring object.

11. A method for optical measurement of surface properties of measuring object comprising steps of
illuminating said measuring object with a light spot,
detect light reflected by said surface of said measuring object by means of a multiplicity of at least three optical sensors, and
evaluating signals of said sensors to determine said surface properties of said measuring object,
wherein signals from a multiplicity of at least three groups of respectively adjacent sensors are used and digitized in a groupwise and separated manner for said evaluation, and
wherein a relative movement is produced between said light spot on said surface of said measuring object and said surface so that said light spot is moved on said surface along a track and a profile progression of said surface along said track is calculated from reflection angles appearing along said track, and
wherein a center of mass of said reflection angles is calculated when at least two sensors detect light due to a broadening of said reflection.

12. A method according to claim 11, in which exactly one sensor is provided for each group.

13. A method according to claim 11, wherein said sensors are arranged substantially along a circular arc having a center on said surface of said measuring object.

14. A method according to claim 11, in which said surface of said measuring object is illuminated in a manner inclined against a normal on said surface.

15. A method according to claim 11, wherein the light reflected by the surface of said measuring object is bundled with a lens onto said sensors.

16. A method according to claim 11, in which said sensors are stationary, said measuring object is a material run conveyed along a production line, and said relative movement follows from said conveying of said material run.

17. A method according to claim 11, in which said light spot is moved relatively to said surface of said measuring object by an illumination device.

18. A method according to claim 11, in which an extrapolation at borders of a detection angle range is conducted.

19. A method according to claim 18, in which a temporary average of the scattering angle width of the light reflected by said surface of said measuring object is determined, in order to extrapolate at a border of said detection angle range if only a part of the light of said scattering angle width can be detected.

20. A method according to claim 18, in which a maximum is determined within said scattering angle width of the light reflected by said surface of said measuring object.

* * * * *

UNITED STATES PATENT AND TRADEMARK OFFICE
CERTIFICATE OF CORRECTION

PATENT NO. : 7,295,299 B2  Page 1 of 1
APPLICATION NO. : 10/492564
DATED : November 13, 2007
INVENTOR(S) : Harald Schmalfuss It is certified that error appears in the above-identified patent and that said Letters Patent is hereby corrected as shown below:

Title Page, Item (75)  Inventor: should read: Harald Schmalfuss, Geretsried (DE)

Signed and Sealed this

Fifteenth Day of April, 2008

JON W. DUDAS
*Director of the United States Patent and Trademark Office*